United States Patent [19]

Rushby et al.

[11] 4,417,136
[45] Nov. 22, 1983

[54] METHOD AND APPARATUS FOR IMPROVING BANK OPERATION PRODUCTIVITY

[75] Inventors: Robert J. Rushby, Waterloo; Anthony B. Damms, Kitchener, both of Canada

[73] Assignee: NCR Canada Ltd - NCR Canada Ltee, Mississauga, Canada

[21] Appl. No.: 290,029

[22] Filed: Aug. 5, 1981

[51] Int. Cl.³ ............................................. G06F 15/30
[52] U.S. Cl. ............................. 235/379; 235/375; 235/432; 235/376
[58] Field of Search ............... 235/379, 375, 432, 376; 340/146.30

[56] References Cited

U.S. PATENT DOCUMENTS

| | | | |
|---|---|---|---|
| 3,308,439 | 3/1967 | Tink | 235/379 |
| 3,852,571 | 12/1974 | Hall et al. | 235/379 |
| 3,876,864 | 4/1975 | Clark et al. | 235/379 |
| 3,956,615 | 5/1976 | Anderson et al. | 235/379 |
| 4,025,905 | 5/1977 | Gorgens | 340/172.5 |
| 4,027,142 | 5/1977 | Paup | 235/379 |
| 4,091,448 | 5/1978 | Clausing | 364/200 |
| 4,114,027 | 9/1978 | Slater et al. | 235/419 |
| 4,201,978 | 5/1980 | Nally | 235/379 |
| 4,264,808 | 4/1981 | Owens | 235/379 |

*Primary Examiner*—Harold I. Pitts
*Attorney, Agent, or Firm*—J. T. Cavender; Albert L. Sessler, Jr.; George Jameson

[57] ABSTRACT

A system for improving the processing of financial transactions using direct customer entry of the transaction data and automatic verification of this data during proof operations. Each customer prepares his own transaction slip via a remote terminal, which slip is delivered to a teller for verification. During proof and encoding operations, the amount field of each document is read and composed with the data entered by the customer for correspondence; any errors may be corrected at this stage for reconciliation, saving time and labor costs.

19 Claims, 3 Drawing Figures

```
RICHARD E. FITZWATER                    NO. 3220
3719 CALIFORNIA AVE.
    DAYTON, OHIO
                                            56-7890
                         June 5, 19 81       1234
PAY TO THE
ORDER OF   M. J. Snyder              $ 75.00
  Seventy-five and ——————— 00/100  DOLLARS
   THIRD NATIONAL BANK
        DAYTON, OHIO         Richard E. Fitzwater
   ⑆01346⑆ ⑈8765⑈ 4321⑈045435054⑆
```

73 (pointing to NO. 3220 area)
72 (pointing to 56-7890/1234 area)
71 (pointing to MICR line)

METHOD AND APPARATUS FOR IMPROVING BANK OPERATION PRODUCTIVITY

BACKGROUND OF THE INVENTION

This invention relates generally to a system for processing financial transactions and, in particular, to a system for efficiently and reliably completing a banking transaction in which the customer directly enters financial information at a remote terminal unit.

Financial institutions are constantly striving to improve the quality of their services, but without incurring any additional expenses to provide these improved services. Thus, in order to be marketable, any new system must be cost-effective; the processing cost per item must be lower than current systems when comparing the same processing functions and volumes. These costs can be broken down into the following categories: capital costs and operating costs. In the financial industry, a major portion of the operating costs is expended in the area of teller operations, data entry and proof operations, and error reconciliation.

SUMMARY OF THE INVENTION

It is therefore an object of the present invention to provide a banking system which improves accuracy and speed in processing financial transactions, while achieving an overall reduction in processing cost per item.

It is also an object of the present invention to provide a system which simplifies and minimizes the office work required for transactions at a bank.

It is a further object of the present invention to minimize labor costs in the data entry and proof operations of item processing associated with financial institutions by verifying and proving transactions using the concept of courtesy amount verification.

These and other objects of the present invention are accomplished by a novel banking scheme in which each customer prepares his own transaction slips using a customer-accessed terminal. The customer enters the totals from each item to be processed into the terminal, and a machine-readable identification is imprinted thereon. The terminal automatically provides a printed deposit slip at the completion of the transaction, which slip is given to a teller for verification via a terminal located at the teller station. The teller has only to verify the endorsements and amounts entered. Any inconsistencies are corrected at this time, and the transactions may be considered proven. When these items are processed during the proof operation, they may be identified by the machine-readable code, and all data concerning each transaction may be accessed from a processor using this code, which data is useful in verifying and proving all transactions.

BRIEF DESCRIPTION OF THE DRAWINGS

FIG. 3 is a diagrammatic representation of the front of a bank check.

DESCRIPTION OF THE PREFERRED EMBODIMENT

Figure 1:
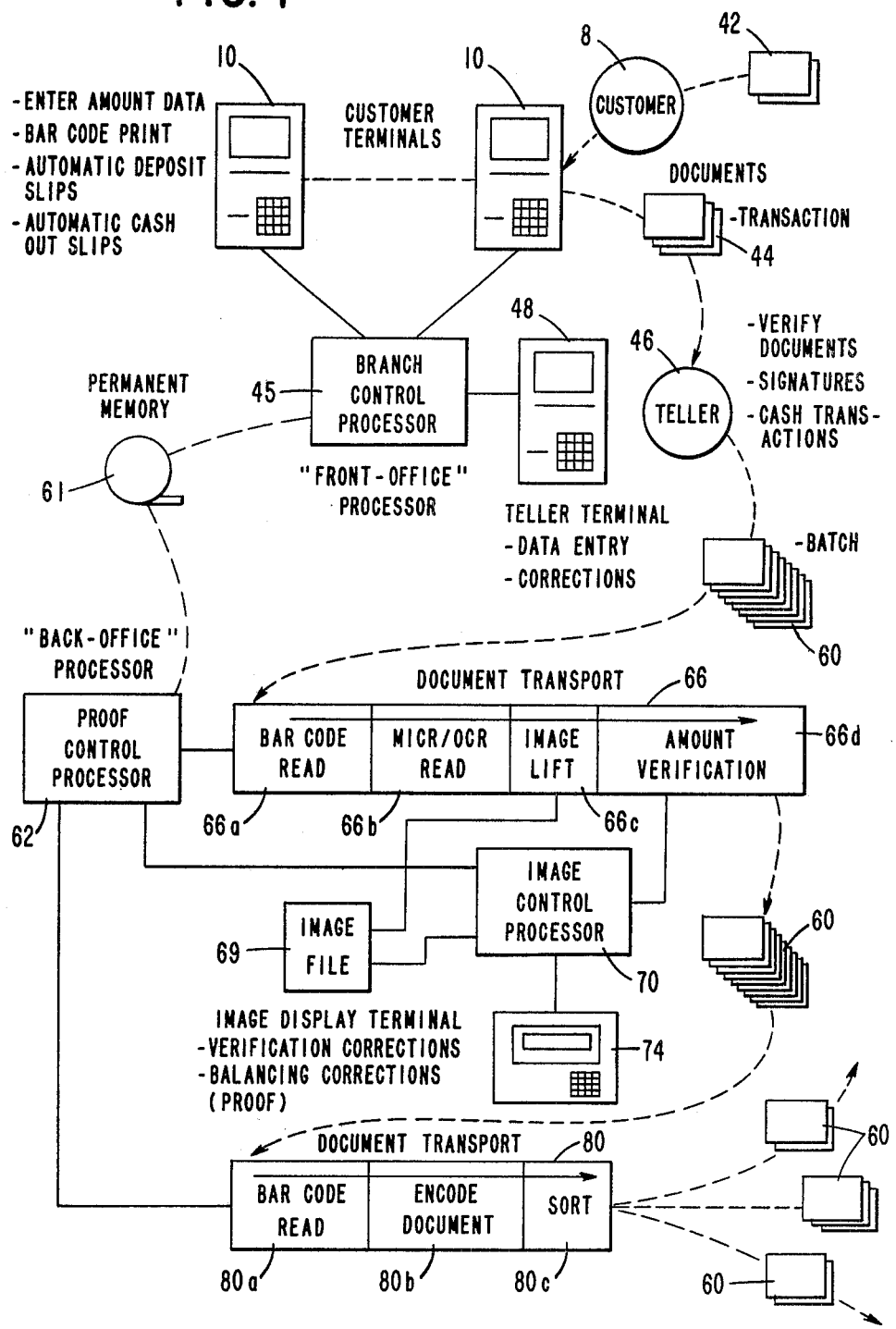
FIG. 1 is a schematic block diagram of the system embodying the present invention.

Referring now to FIG. 1, there is shown a block diagram of a preferred embodiment of the system disclosed in the present invention. A customer 8 proceeds to one of a series of customer terminals 10 situated in a convenient location, such as the lobby, within the financial institution. Terminal 10 is used by each customer to prepare a deposit slip by keying in the amount data for all documents.

Figure 2:
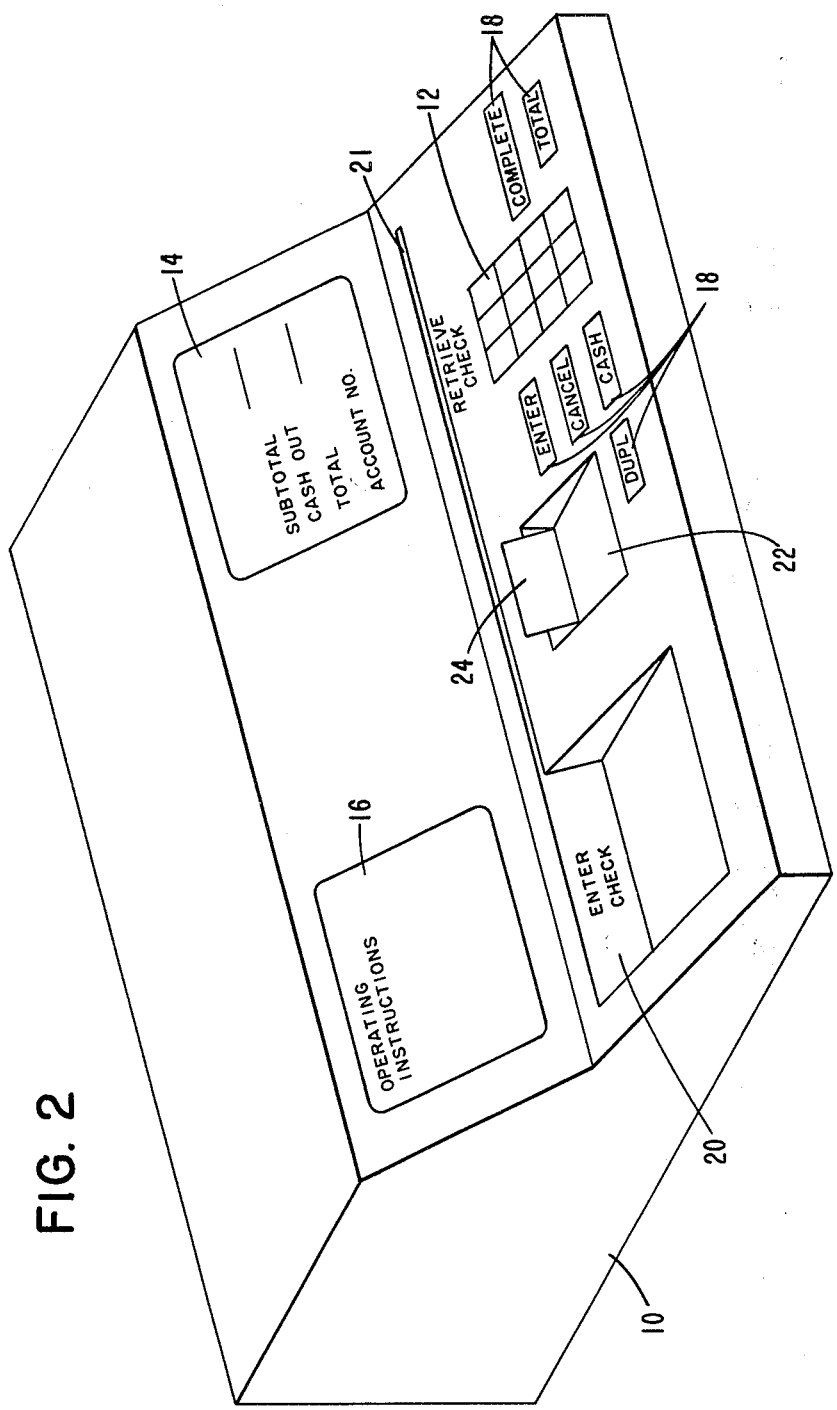
FIG. 2 is a diagrammatic representation of the remote terminal which is employed in the present invention.

Referring now to FIG. 2, there is shown a customer keying terminal 10 which may be used in connection with the present invention. In one mode of operation, the customer may identify himself at terminal 10 by entering a secret personal identification number assigned to him by the financial institution via a keyboard 12. Alternatively, a card bearing a magnetic stripe (not shown) may be used to identify the customer at terminal 10.

When terminal 10 has confirmed the identity of the customer, the terminal displays an image representing a deposit slip upon a cathode ray tube (CRT) screen 14. A chart 16 displays a series of lead-through instructions for assisting the customer in completing the sequence for generating his deposit slip. A set of control keys generally indicated by the numerical designation 18 are used for controlling operation of the transaction entry process.

To begin generation of a deposit slip, the customer first enters his personal account number via keyboard 12, and loads this information into terminal 10 by depressing the ENTER key 18. He next enters via keyboard 12 the amount on the first document he wishes to deposit. After the amount is entered and displayed on CRT screen 14, the customer inserts the document into a printer module 20, and depresses the ENTER key 18, causing printer module 20 to operate. As each document is transported into printing relationship within module 20, a document identification number (DIN) is printed in bar code form on the reverse side of the document, while a human-readable amount corresponding to the amount entered on keyboard 12 is printed on the front side. The customer then removes the document from a receptacle 21 of module 20. The customer repeats the above sequence for each of the documents that he wishes to deposit.

As the bar-coded DIN is being printed on each document to positively identify it, a data file is created which relates that particular document to its bar code. This data is transmitted from customer terminal 10 via a data link to a branch control or "front office" processor 45 (FIG. 1). All of the customer terminals 10 are coupled in parallel to processor 45.

If the customer wishes to receive any cash in the transaction, he enters the desired amount via keyboard 12 into terminal 10 after he has processed all deposit documents. He then depresses the CASH key of control keys 18, which causes a cash out slip (not shown) to be printed at a receipt printer module 22, which slip is encoded with a bar code on the reverse side.

After all keying is complete, the customer depresses the TOTAL key 18, causing terminal 10 to total the complete transaction, with the resulting figures displayed on CRT screen 14. If the displayed totals are agreeable to the customer, he depresses the COMPLETE key 18, causing a deposit slip 24 to be printed at receipt printer module 26 for the customer, which slip is also bar-coded and contains the customer account number. At this time, terminal 10 stores the details of the transaction, including amounts, bar codes, and customer information, in the data file within processor 45. The customer removes deposit slip 24 from printer module 22, and proceeds to the teller window. A duplicate of deposit slip 24 for the customer's personal records may be obtained by depressing the DUPL key 18.

Referring again to FIG. 1, at the time the customer appears at the teller window, he presents the bank documents, which have previously been encoded at terminal 10, along with completed deposit slip 24 and any cash out slips (which group of documents comprise a transaction 44) to a teller 46. Teller 46 checks every document contained in the transaction to determine that each amount has been correctly entered, that all items entered on the deposit slip are present, and that all necessary signatures are present. Any errors that teller 46 detects are corrected via a terminal 48 at the teller window. Terminal 48 is coupled on-line to processor 45, as are the customer terminals 10. Teller 46 can access the data file associated with a transaction within processor 45 by keying in the customer account number. The data will appear on a CRT screen at teller terminal 45, and teller 46 may correct any errors via keyboard entry. When teller 46 has determined that all steps of the transaction have been completely correctly, he depresses an entry key on teller terminal 45 which allows the data associated with the transaction to be permanently stored within processor 45.

At this stage, the system may consider all transactions as proven. Physical control (by DIN) has been established, and the only errors which can occur from this point on are misplaced items. In addition, it should be noted that the teller has less work to do than under the current system, as no checking of calculations is required.

An in-balance data file has now been created on a transaction level; during the course of the business day, the teller accumulates transactions into a batch file 60. Batch file 60 should always be in balance; that is, the debits will always equal the credits. Batch file 60 is then stored on a permanent memory device 61 such as a cartridge or disc at the processor in the branch or "front office" processor 45.

Documents accumulated during the course of the business day are physically taken in batches to the bank processing center to be processed. The data file which was created at branch control processor 45 is also transmitted to the bank processing center. This data file may be transferred physically by tape cassette or floppy disk (permanent memory 61), or processor 45 may be linked directly on-line to the processing center. A proof control or "back office" processor 62 located at the bank processing center receives the data file from the branch control processor 45. In financial institutions which use completely centralized processing systems, proof control processor 62 and branch control processor 45 may be replaced by a single central processor. In the present embodiment, the "back office" proof control processor 62 is file-driven, using the bar code to identify each document and relate it to the previously captured data which was permanently stored in memory 61 and subsequently stored within the processor.

Each document contained in batch 60 is subsequently passed through a document transport 66 for proof and encoding operations which includes a bar code reader 66a, a MICR or OCR reader 66b, an imaging device 66c, and a verification unit 66d. As each document is conveyed through transport 66, the bar code is read from the document by reader 66a, allowing processor 62 to associate the document with the customer-entered information within the data file created previously. Reader 66b then reads the MICR information which is printed on the face of the check. The document image is digitized by imaging device 66c and then transmitted to an image file 69, which is coupled to a courtesy amount verification processor (or image control processor) 70.

The concept of courtesy amount verification may be defined as the process of verifying through optical character recognition techniques that an amount that is presumed to be written on a document is indeed present. The courtesy amount on a bank check is the amount written as numeric characters, as opposed to the legal amount, which is written out in alphabetic characters. FIG. 3 shows a diagrammatic representation of a bank check containing both the legal amount and courtesy amount. The legal amount is designated as 71, while the courtesy amount is designated as 72.

Courtesy amount verification techniques can also be used in other applications where there is a need to verify that expected data is correct. Courtesy amount verification provides the following useful characteristic to the system of the present invention: it is much simpler to compare each character of a previously known amount with characters found on an image in order to verify that these characters are present, as compared to identifying a totally unknown amount on a document; this is true because the recognition equipment need only compare the read character features with a single known character for each digit, rather than compare each read character with a larger set of possible character features. Thus, the misread rate of the system becomes less important.

The courtesy amount verification processor 70 locates and isolates the numerals comprising the courtesy amount data on the document. This may be achieved by using either pre-defined coordinates on the document, or by using a leading character symbol, such as $ (which is designated as 73 in FIG. 3). When the courtesy amount data field has been located, the field is segmented into individual numeric characters using conventional character recognition techniques.

When each character contained in the courtesy amount field has been recognized and identified, this quantity is compared to the data which was initially entered by the customer and is contained in the data file in processor 62 for correspondence. If there is correspondence, the transaction is proved, and a confirmation is entered into the data file for that document, and then transmitted to verification unit 66d.

However, if the courtesy amount verification processor 70 indicates an error, or fails to verify the amount printed on the face of the document, the complete digitized image is displayed to the proof operator on a CRT screen at a terminal 74 where the operator visually verifies the amount and keys in the correct data to the file, or, alternatively, the operator may retrieve the physical document to verify the amount and correct the file.

A data file having been created which contains documents which have all been reconciled, and proof balance having been established on all the transactions in the batch file 60, the documents are physically transferred to a second document transport 80, which includes a bar code reader 80a, a MICR encoder 80b, and a sorting mechanism 80c. As each document is conveyed through transport 80, the bar code is read from the document by reader 80a, and the data associated with that document is transmitted to transport 80 from processor 62. The amount data received from processor 62 is then encoded in MICR form on the face of the check by encoder 80b. At this point, the documents in latch 60 are sorted by sorter 80c according to one or more criteria, such as the bank upon which the document has been drawn.

The concept of courtesy amount verification can also be applied when using conventional proof and encode machines. In this situation, an operator normally reads bank documents and enters the appropriate data via a keyboard. A courtesy amount verification unit would read the amount automatically from the document (via an image lift unit) to verify that the amount entered manually is correct. If there is a discrepancy, the document record would then be flagged. This flag could be used to aid the operator if the batch of documents is in an out of balance condition (i.e., to indicate possible miskeyed documents).

While the invention has been shown and described in terms of a preferred embodiment thereof, it will be understood that this invention is not limited to this particular embodiment and that many changes and modifications may be made without departing from the true spirit and scope of the invention as defined in the appended claims.

We claim:

1. A system for processing financial transactions, said system comprising:
   first processing means;
   first terminal means, coupled to said first processing means, for permitting a customer to enter into said first processing means information obtained from a document of the customer, said document being contained in a financial transaction;
   second terminal means, coupled to said first processing means and said first terminal means, for enabling a teller to verify said customer-entered information;
   first storage means, coupled to said first processing means, for storing said customer-entered information subsequent to said teller verification;
   second processing means for receiving said teller-verified customer-entered information stored within said first storage means;
   document processing means for generating information from said document of the customer; and
   third processing means for automatically comparing information generated by said document processing means with said customer-entered information within said second processing means for correspondence therebetween.

2. The system of claim 1, wherein said first terminal means includes means for verifying the identity of each customer.

3. The system of claim 1, wherein said first terminal means includes a keyboard for entering said information concerning a financial transaction.

4. The system of claim 1, wherein said first terminal means includes means for encoding each document contained within said transaction.

5. The system of claim 1, wherein said first storage means comprises a magnetic disk.

6. The system of claim 1, wherein said first storage means comprises a tape cassette.

7. The system of claim 1, wherein said second terminal means includes means for correcting any customer-entered information which is deemed erroneous.

8. The system of claim 1, wherein said first and second processing means are coupled by a direct data link.

9. The system of claim 1, wherein said first storage means is physically delivered to said second processing means.

10. The system of claim 1, wherein said first and second processing means are included within a single computer.

11. The system of claim 1, wherein said document processing means includes:
    means for reading information encoded upon a document;
    character recognition means for reading courtesy amount data located on the face of said document;
    and means for producing a facsimile image of the face of said document.

12. The system of claim 11, further including second storage means for storing said facsimile image.

13. The system of claim 12, wherein information obtained by said reading means accesses customer-entered information within said second processing means.

14. The system of claim 13, wherein said accessed information is compared with said data read by said character recognition means for correspondence.

15. The system of claim 14, further comprising means, coupled to said second storage means and said third processing means, for displaying said facsimile image when said third processing means does not indicate correspondence.

16. The system of claim 15, wherein said display means includes means for amending said accessed information within said second storage means to attain correspondence.

17. A method for processing financial transactions within a bank, comprising the steps of:
    (a) enabling a customer to enter into a first processing means information obtained from a document of the customer through the use of a first terminal means;
    (b) enabling a teller to verify said customer-entered information by use of a second terminal means;
    (c) permanently storing within a first storage means said customer-entered information subsequent to teller verification;
    (d) delivering said verified customer-entered information within said second processing means for data to a second processing means;
    (e) generating information from said document of the customer; and
    (f) comparing the information generated from said document of the customer with said customer-entered correspondence therebetween.

18. The method of claim 17, wherein the teller verifying step further comprises the step of correcting any customer-entered information which is deemed erroneous.

19. The method of claim 17, wherein said information generating step further comprises the steps of:
    (a) reading information encoded upon a document;
    (b) reading the courtesy amount data located on the face of said document; and
    (c) producing a facsimile image of the face of said document.

* * * * *

UNITED STATES PATENT OFFICE
CERTIFICATE OF CORRECTION

Patent No. 4,417,136     Dated November 22, 1983

Inventor(s) Robert J. Rushby and Anthony B. Damms

It is certified that error appears in the above-identified patent and that said Letters Patent are hereby corrected as shown below:

Column 6, line 49, delete "informa-".

Column 6, line 50, delete "tion within said second processing means for".

Column 6, line 56, after "entered" insert --information within said second processing means for--.

Signed and Sealed this

Seventeenth Day of July 1984

[SEAL]

Attest:

GERALD J. MOSSINGHOFF

Attesting Officer    Commissioner of Patents and Trademarks